United States Patent
Cottrille et al.

[11] Patent Number: 6,076,100
[45] Date of Patent: Jun. 13, 2000

[54] SERVER-SIDE CHAT MONITOR

[75] Inventors: Scott C. Cottrille, Bellevue, Wash.; Ashesh P. Bakshi, San Jose, Calif.

[73] Assignee: Microsoft Corporation, Redmond, Wash.

[21] Appl. No.: 08/971,852

[22] Filed: Nov. 17, 1997

[51] Int. Cl.[7] .................................................... G06F 13/00
[52] U.S. Cl. ........................ 709/203; 709/204; 709/219; 709/229
[58] Field of Search .................................. 709/203, 204, 709/219, 229, 244

[56] References Cited

U.S. PATENT DOCUMENTS

| | | | |
|---|---|---|---|
| 5,779,549 | 7/1998 | Walker et al. | 463/42 |
| 5,835,722 | 11/1998 | Bradshaw et al. | 709/225 |
| 5,862,223 | 1/1999 | Walker et al. | 380/25 |
| 5,884,033 | 3/1999 | Duvall | 709/206 |
| 5,907,602 | 5/1999 | Peel et al. | 379/114 |

OTHER PUBLICATIONS

Net Nanny Software International, NN Pro, p. 1, Mar. 12, 1997.

*Primary Examiner*—Zarni Maung
*Assistant Examiner*—Abdullahi E. Salad
*Attorney, Agent, or Firm*—Michalik & Wylie, PLLC

[57] ABSTRACT

A system and method for improved monitoring of chat room conversations, including a database which stores penalty information corresponding to the identities of users. When the identity of a user on a channel is received, the database is queried with the identity of the user. In response, penalty information corresponding to that user is received, and if found, a penalty corresponding to the penalty information is automatically applied to the user. The system and method also provide a mechanism for handling user complaints. User complaints are received from a user at the chat channel and forwarded to a complaint channel for review by a monitor client. The system receives a response to the complaint message from the monitor client, which may include one or more assessed penalties. The penalty information is applied to the user and stored in the database.

49 Claims, 5 Drawing Sheets

SERVER-SIDE CHAT MONITOR

FIELD OF THE INVENTION

The invention relates generally to computers and computer online services, and more particularly to the monitoring of chat room conversations.

BACKGROUND OF THE INVENTION

Online services such as The Microsoft Network offer facilities for multiple users to simultaneously chat with each other in real-time. In general, a chat room is provided to members of the service for remote discussion on a particular topic. In part because of the relative anonymity of the participants, chat channel conversations often get out of hand, become off-topic, offensive and even create possible legal issues for the online service provider.

To deal with such improper use, online services hire employees to monitor chat room conversations, and provide these (human) monitors with the ability to apply penalties to offending users. Such penalties include the ability to "ban" a user, i.e., permanently or semi-permanently prevent the user from connecting to the chat channel or server, or "kick" a user, i.e., cause a one-time removal of the user from the chat channel. Less drastically, the service can place a user in a "spectate" mode, which allows the user to view the conversation but prevents the user from publicly speaking in the chat channel for a period of time. Lastly, the service can "warn" the user instead of applying one of the more severe penalties.

However, in order to apply one of these penalties or warn a lesser offender, current solutions require substantial intervention by a human being. First, the monitor observing improper chat room conversation applies a suitable penalty to an offender. Then, if a penalty was applied, each time the user connects, the penalty needs to be re-applied. Later, subsequent human intervention is required for removal of the penalty at the appropriate time. As can be appreciated, this is expensive in terms of manpower and leads to errors which can alienate subscribing members.

In addition, chat room participants have no consistent way in which to register complaints against (allegedly) offending other users. As a result, to effectively monitor what is taking place in the chat room, each chat room requires an active and dedicated monitor at virtually all times. Moreover, even if a complaint is received by the online service, (e.g., via e-mail), there is no consistently reliable and impartial record by which to mediate the complaint on its merits. Lastly, conventional monitoring solutions are based on the client-side. If the client used for monitoring crashes, the monitoring ceases even though the chat room may still be being accessed by participants connected through other clients.

OBJECTS AND SUMMARY OF THE INVENTION

Accordingly, it is an object of the present invention to provide an improved chat room monitoring system and method.

In accomplishing that object, it is a related object to provide a chat room monitoring system and method that is centrally based on the server side.

Another object is to provide a chat room monitoring system and complaint mechanism that allow a single individual to effectively monitor a plurality of chat rooms.

Still another object is to provide the monitoring system and method as characterized above that substantially eliminates the need for human involvement in re-applying user penalties or in causing penalties to expire.

Yet another object is to provide a system and method of the above kind that facilitate user complaints.

Another object is to provide a system and method that facilitate mediation of complaints, either locally or remotely.

Briefly, in a computer network configured for chat room conversations by client users connected to chat channels of a server, the present invention provides an improved system and method for applying penalties against users. The system and method include a database for storing penalty information corresponding to the identities of users. A server-side chat service component is connected to the database, and receives the identity of a user on a channel (periodically and/or each time a user joins the channel). The service component queries the database with a query based on the identity of the user, and in response, receives penalty information corresponding to that user from the database. If found, a penalty corresponding to the penalty information is applied to the user.

The system and method also provide a mechanism for handling user complaints. Complaints are received from one user at the chat channel and forwarded to a complaint channel for review by a monitor client. The system receives a response to the complaint message from the monitor client, which may include one or more penalties typically for assessing against another user.

Other objects and advantages will become apparent from the following detailed description when taken in conjunction with the drawings, in which:

DETAILED DESCRIPTION OF THE PREFERRED EMBODIMENT

Exemplary Operating Environment

Figure 1:
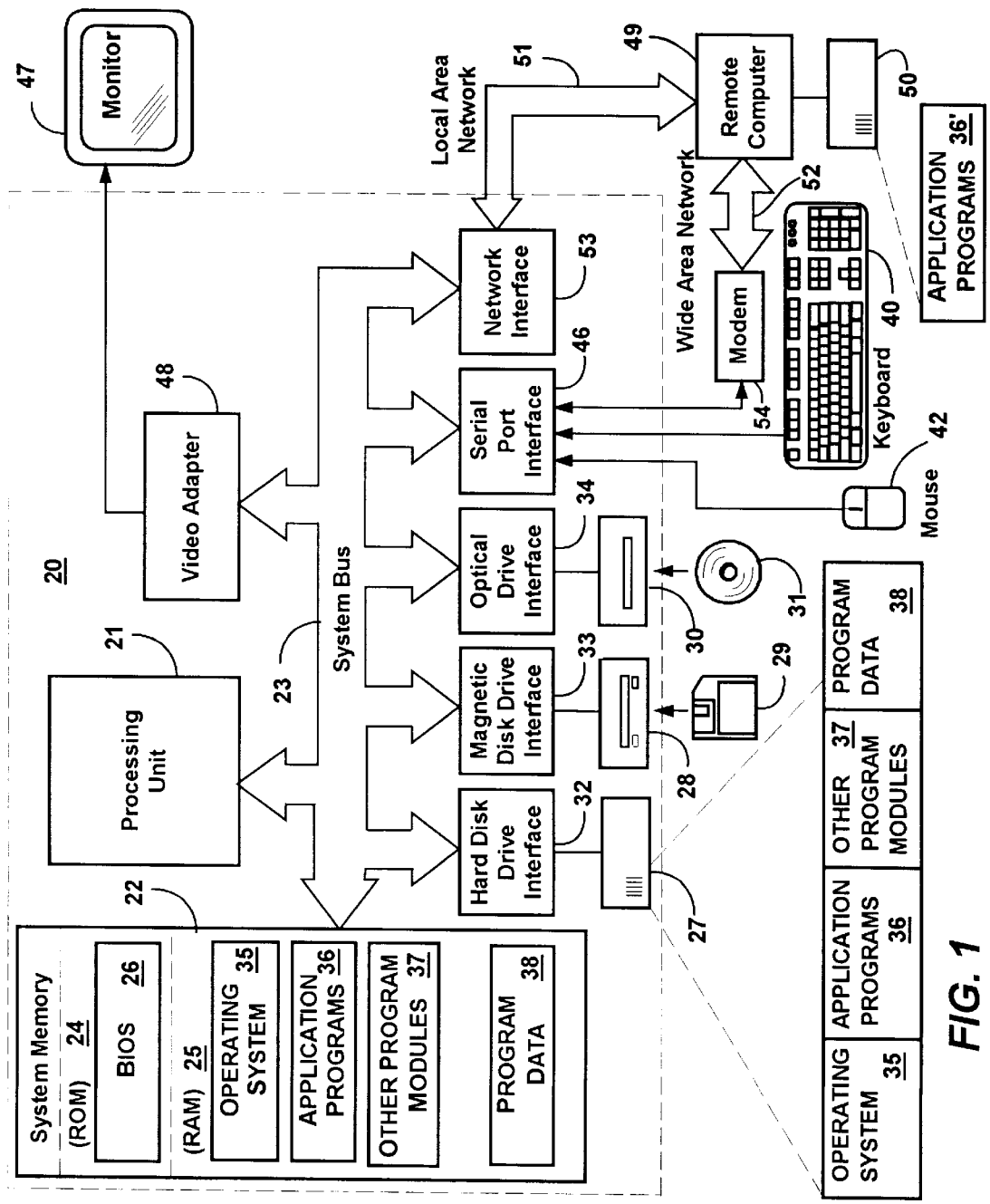
FIG. 1 is a block diagram representing an exemplary computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMS) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

For purposes of the present invention, the above-identified computer system 20 may serve as a chat server 60 (FIG. 2) described hereinafter, while the remote computer 49 may represent one or more client computers $62_1$–$62_n$, $64_1$–$64_n$ typically connected via the WAN 52. The chat server 60 is also connected to an SQL server 66 having at least one database 68 therein. Note that the SQL server 66 may actually be in the same physical computer as the chat server 60, or the chat server 60 and/or SQL server 66 may comprise any number of computers connected together. Moreover, as used herein, the term "database" may represent one or more distinct databases. For example, a separate complaint database and penalty database, along with possibly other databases, may be used to store the various pieces of information described herein. However for purposes of simplicity, as used herein, the singular term "database" will refer to one or more databases which store such information.

Figure 2:
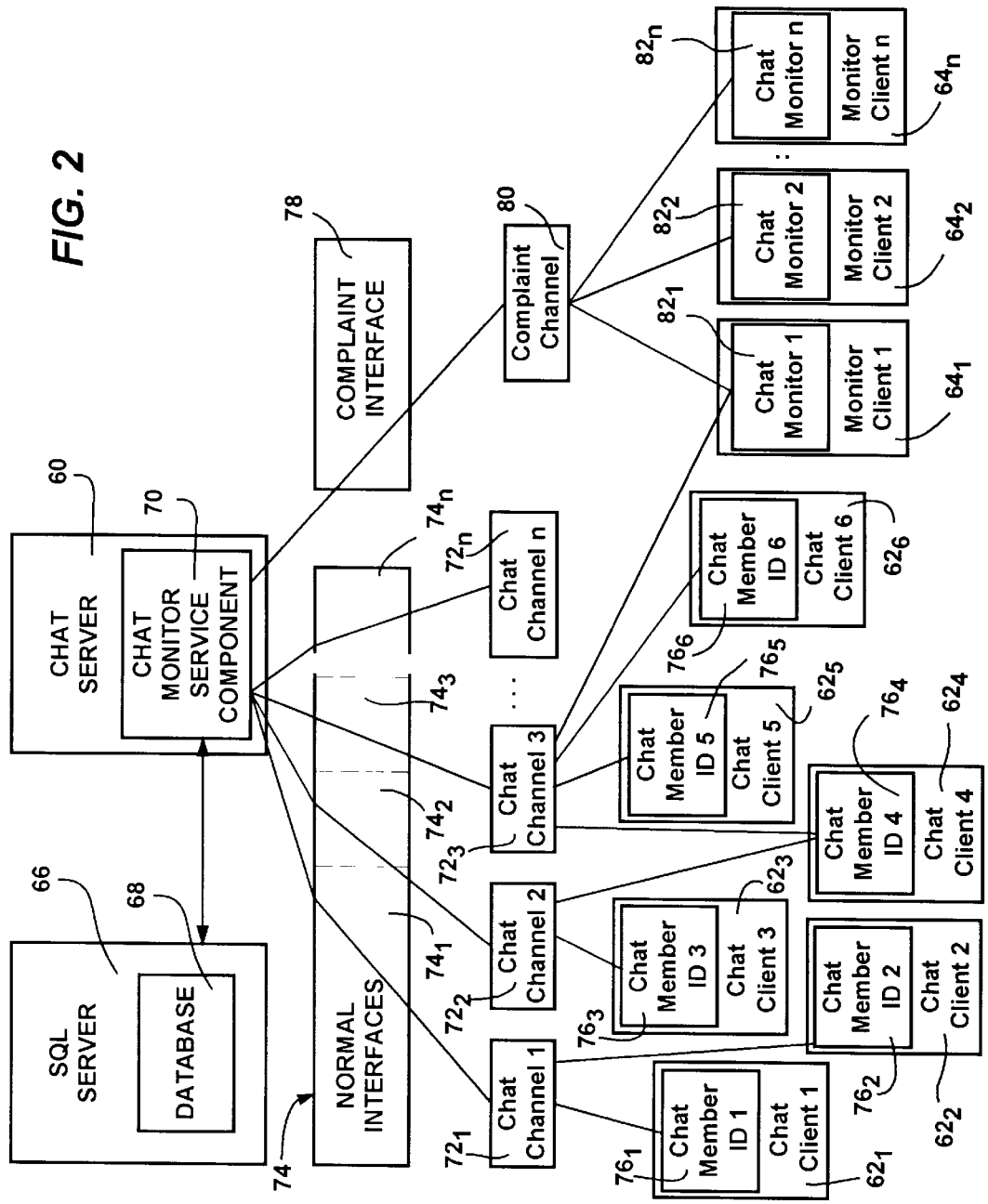
FIG. 2 is a block diagram representing an exemplary arrangement of a chat server connected to chat clients and to monitor clients in accordance with one aspect of the present invention.

As best shown in FIG. 2, a server-side chat service component 70 exists on the chat server 60 and is loaded by the server 60 on demand, and is preferably implemented as a dynamic link library (DLL). As also shown in FIG. 2, the server-side chat service component 70 is "attached," via a configuration application in the chat server 60, to chat channels (chat rooms) $72_1$–$72_n$ of the chat server 60, through normal conversation channel interfaces ($74_1$–$74_n$ collectively 74). The channel interface 74 comprises a block of memory (in the memory 22) that allows each chat channel $72_1$–$72_n$ and the server-side chat service component 70 to communicate with each other, and gives the server-side chat service component 70 low-level access to events that occur on each specific channel $72_1$–$72_n$ to which it is attached. Chat members $76_1$–$76_n$ connect to the chat channels $72_1$–$72_n$ through the chat clients $62_1$–$62_n$. Note that a member such as the member $76_4$ can simultaneously join multiple channels such as the channels $72_2$ and $72_3$.

In accordance with one aspect of the present invention, the server-side chat service component 70 also supports a complaint channel interface 78 for connecting a complaint channel 80. Chat monitors $82_1$–$82_n$ connect to the complaint channel 80 through the monitor clients $64_1$–$64_n$. The complaint channel 80 enables the system to run centrally, yet provides an enforcement mechanism that may be accessed remotely. Although not necessary to the present invention, for purposes of simplicity, only one complaint channel interface 78 may be requested at a time, however it can be appreciated that multiple complaint channel interfaces are feasible. There is no such restriction imposed on the number of normal conversation channel interfaces 74 that may be requested and granted.

When a channel interface is requested by the chat server 60, the chat server 60 requests either a normal channel interface 74 or the complaint channel interface 78. Once attached to a channel (e.g., channel $72_1$), the chat server 60 requests (from the server-side chat service component 70) and starts a channel interface, (e.g., $74_1$), typically the first time a member (e.g., $76_1$) joins that channel $72_1$. If the type of requested interface is recognized by the server-side chat service component 70, the server-side chat service component 70 returns a unique instance of this interface $74_1$. The chat server 60 then maintains this instance, or block of memory, and communicates to the chat channel $72_1$ therethrough for as long as the channel exists. Alternatively, the normal channel interface 74 may be permanently loaded in the server memory 22. One channel interface is requested by the chat server 60 per chat channel, and this channel interface (e.g., $74_1$) exists for the life of the channel (e.g., $72_1$). Note that a channel typically exists as long as there are members therein (unless permanently loaded). Thus, the chat server 60 reuses the channel interface $74_1$ given to it for a channel $72_1$ when another member (e.g., $76_2$) joins the channel $72_1$.

Similarly, the complaint channel interface 78 may be instantiated when a first monitor client (e.g., $64_1$) requests a connection to the complaint channel 80. Alternatively, the complaint channel interface 78 may be permanently loaded in the server memory 22. In any event, the complaint channel interface 78, described in more detail below, also comprises a block of memory used like the normal interfaces for communication and other purposes. Note that a monitor client such as $64_1$ can also connect to one or more chat channels (e.g., $72_3$) for direct monitoring thereof.

In accordance with another aspect of the present invention, monitors $82_1$–$82_n$ can issue penalties based upon a direct observation of a chat channel conversation or based upon a complaint recorded in the SQL server database 68. Penalties issued by a monitor client $82_1$–$82_n$ to a currently connected member (e.g., $76_1$) are immediately handled by the server-side chat service component 70. Later, after a penalty has been assigned to a user via a chat monitor client $64_1$–$64_n$, the penalty is automatically tracked and applied whenever the user connects to the chat server 60, and automatically removed when it expires.

Chat Monitor Component

Figure 5:
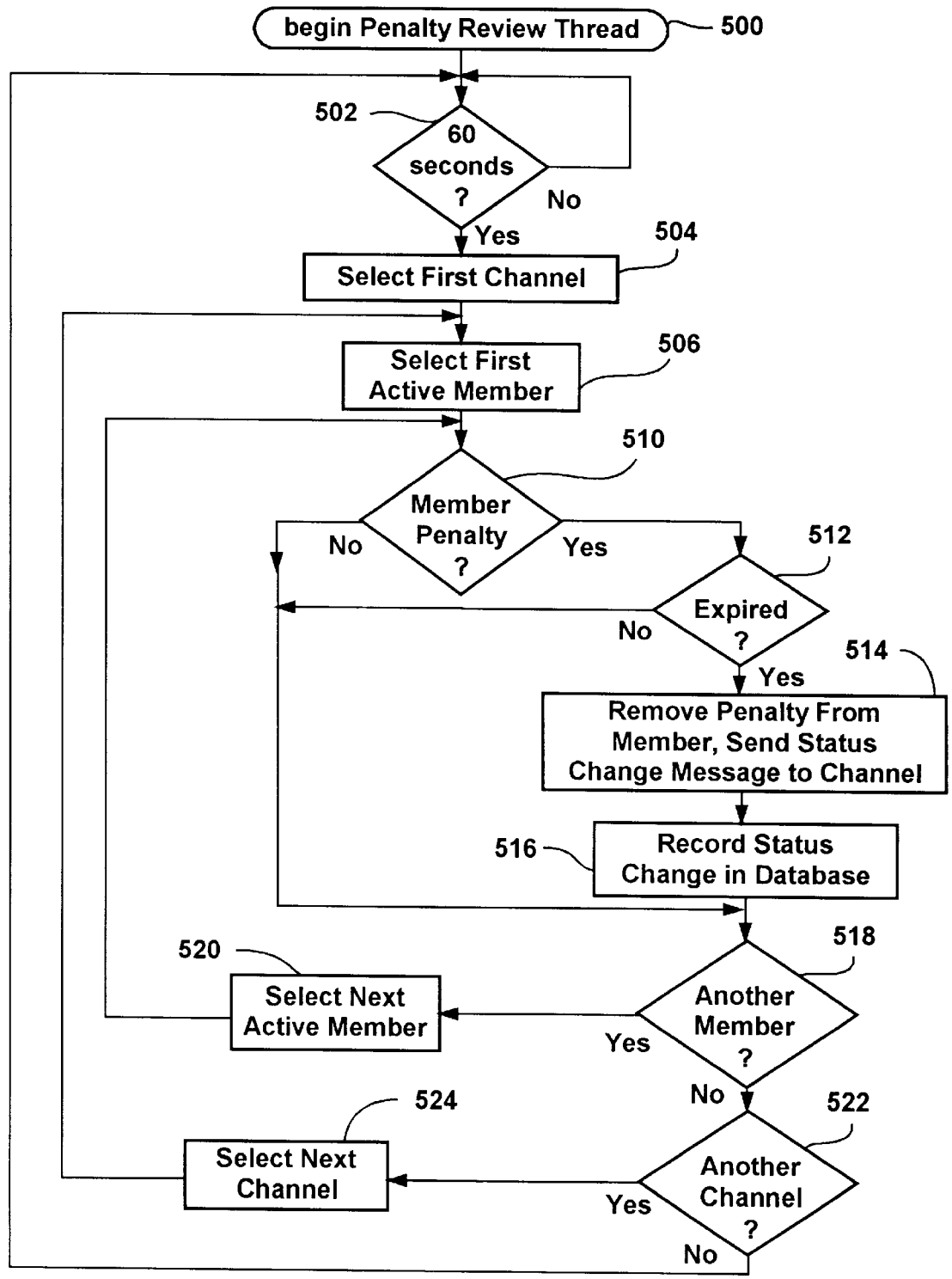
FIG. 5 is a flow diagram representing the general steps taken by the normal channel interface to handle various notifications.

When the server-side chat service component 70 is first initialized, the component 70 creates a special penalty review thread, generally represented by the flow diagram of FIG. 5 beginning at step 500. As represented by step 502, this penalty review thread wakes up every sixty seconds (or some other predetermined period) and enumerates all normal channel interfaces $74_1$–$74_n$ starting with a first interface at step 504. As the server-side chat service component 70 enumerates each interface $74_1$–$74_n$ (where each interface $74_1$–$74_n$ corresponds to a unique channel), the server-side chat service component 70 triggers a penalty review for the interface/channel. During this penalty review, any penalties being applied against active channel members are examined at step 510 to see if the penalty has expired, beginning with a first active member of that channel at step 506. If the penalty has expired, (step 512) the penalty is automatically removed from the member (e.g., $76_1$) and a message is sent to the appropriate channel indicating the status change at step 514. This status change is also recorded in the database 68 at step 516, so that in the future, when this particular member joins the channel, the penalty will not be applied. Steps 518 and 520, along with steps 522 and 524, repeat the review process for each active member and each channel, respectively.

Note that as described below with reference to FIG. 4, penalties are also automatically reviewed as each member joins a channel. The functionality in these two situations is similar, with the exception that penalty review during a member join event (FIG. 4) can cause the member to be prevented from joining the channel. Note that during the penalty review period triggered by the review thread (FIG. 5), only spectate penalties need be reviewed, because all other penalties result in the member being prevented from joining the channel in the first place.

As another powerful feature, penalties can be applied to any user at any time, even those users not currently connected. This overcomes the situation where a member causes a problem sufficient to warrant a penalty, but then quickly logs off hoping to avoid a penalty. To this end, a penalty is entered based on the member's unique ID, so that even if a member is not logged on, the member can still be penalized.

Although not necessary to the invention, the server-side chat service component 70 is somewhat flexible in its configuration, providing for some performance tuning. For example, many operations performed by the server-side chat service component 70 involve storing or retrieving information in the SQL database 68 (described below). Requests to transact with the SQL database 68 are thus marshaled through a centralized mechanism that manages multiple simultaneous connections to the database 68. The number of simultaneous connections to the SQL database 68 is configurable and typically modified by a system administrator based on the capabilities of the server 60 on which the server-side chat service component 70 is running, as well as the expected or actual load from the chat server 60. The number of connections is specified via a registry setting, as is the conversation context history size, (described below).

Normal Channel Interface

Figure 4:
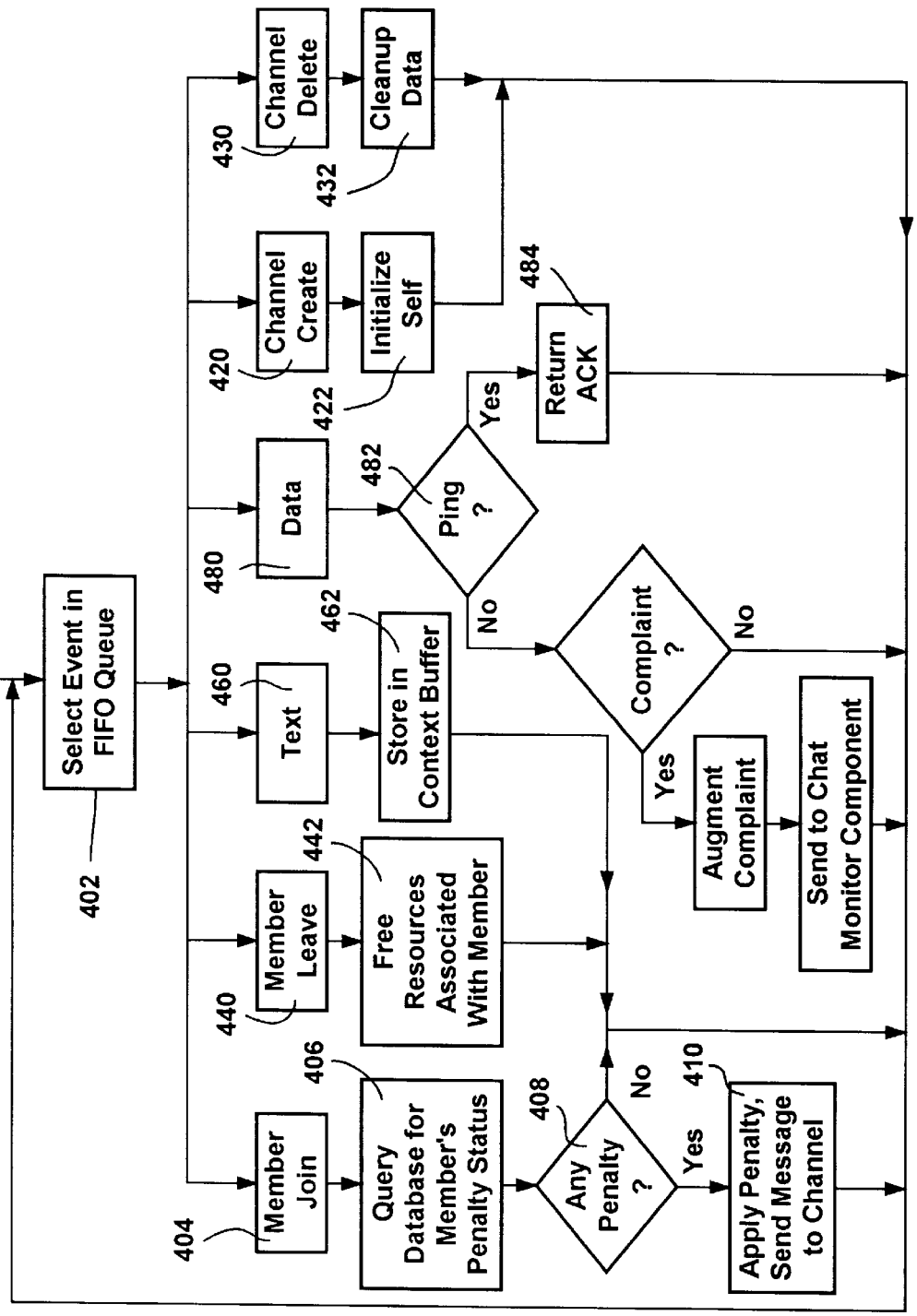
FIG. 4 is a flow diagram representing the general steps taken by the server-side chat service component to periodically review penalty statuses of members.

Each channel interface $74_1$–$74_n$ has associated with it a separate thread and a task queue, generally represented in FIG. 4. Requests (data events) that occur on a specific channel are added to the task queue in a first-in, first-out manner. As represented by step 402 of FIG. 4, the channel thread removes tasks from the beginning of this queue, and processes them independent of the chat server 60. This asynchronous task processing frees up the primary thread (i.e., the thread that is responsible for member events including joins, leaves and receipt of data) of the chat server 60 as much as possible. As a result, the chat monitor clients $64_1$–$64_n$ ordinarily receive quicker responses from the server 60.

The communication between the server-side chat service component 70 and the normal channel interface 74 includes six notifications, including notification of joining or leaving chat members, text and data sent by members and channel creation and deletion. The normal channel interface 74 responds to all six notifications (chat members joining or leaving, text and data sent by members and channel creation and deletion) from the chat server 60. As represented in FIG. 4, at steps 420–422 the normal channel interface 74 initializes itself on a channel creation event, while at steps 430–432 the normal channel interface 74 cleans up its data on a channel deletion event in preparation for being freed from memory 22.

As best shown in FIG. 4, to accomplish the application of a previously issued penalty, when the normal channel interface 74 removes an event/task from its FIFO queue at step 402 and determines that it is a member join event at step 404, the normal channel interface 74 queries the SQL database 68 at step 406 for the user's penalty history based on the user's ID, which the chat server 60 provides. Note that the query is indirectly placed through the server-side chat service component 70. As can be appreciated, penalties are applied based on the user ID, not the alias under which the user logs on, so that the user cannot escape punishment by simply logging out and then logging in under a new alias.

At step 408, if the user has any penalties against them, the chat monitor checks each active penalty against this user to see if the penalty has expired. Then, any non-expired, active penalties are automatically applied to the member at step 410 and a message is sent describing the penalty that has been applied and the original reason why the penalty was applied. Types of penalties that are presently recognized and supported include warnings, spectates, kicks and bans. A warning has no effect on the user and is merely recorded in the database 68, a spectate penalty prevents the user from talking, a kick penalty removes the user from the channel temporarily, and a ban penalty prevents the user from joining the channel permanently. Penalties can be removed by a monitor ($82_1$–$82_n$), or can be automatically expired by the system once an expiration date (if any) associated therewith is reached.

Penalties are ranked, with the most severe type of penalty being imposed when a user has multiple penalties that have not expired. More particularly, the worst of similar penalties are chosen, and kicks and bans are applied before, and exclusive of, spectates. If two spectates exist against a member, the spectate penalty having the later expiration time is chosen. If a member has a ban or kick and a spectate penalty, only the ban or kick will be applied, because a ban or kick removes them from the channel (and thus there is no need to apply a spectate penalty.) Of course, other types of penalties and/or ranking schemes are feasible and may be easily incorporated into the system. Moreover, penalties may be aggregated using simple rules, (e.g., four warnings equals a ten minute spectate).

As shown by steps 440–442, when the normal channel interface 74 receives a member leave event, i.e., a member has logged off, the normal channel interface 74 frees any memory allocated for and associated with that particular member. For example, any penalty-related memory that may be associated with a member is freed when that member logs off.

To handle text events, as shown at step 460, when the normal channel interface 74 receives a text event from a member, (i.e., when a member sends a text message to the channel), at step 462 the normal channel interface 74 stores the text message in a circular context buffer or the like. The buffer stores a representation of a recent history of the conversation in the room (the conversation context at that time.) The length of this history buffer is configurable via a registry key, and its purpose will be described below with respect to conversation monitoring.

The normal channel interface 74 also recognizes two specific types of data messages (step 480) from the chat clients $76_1$–$76_n$. A first type of data message is sent by a chat client to determine if the channel supports the chat monitoring protocol of the present invention. In response to this "ping" message (detected at step 482), the normal channel interface 74 returns an acknowledgment message at step 484 indicating that the normal channel interface 74 does support the chat monitoring protocol (described below). Other chat servers that do not support the chat monitoring protocol do not respond, at least not in an appropriate manner. In this way, chat clients may determine whether chat monitoring functionality exists and accordingly enable or disable complaint features.

In accordance with another aspect of the present invention, the second type of data message recognized by the normal channel interface 74 is the complaint message. A complaint message is sent by a chat member 76 to the normal channel interface 74 when the user of the chat client wishes to file a complaint, typically against another member.

To accomplish the complaint mechanism, there is provided a protocol, described in more detail below, whereby normal chat client applications can give their users a way to file a complaint. When a complaint is filed by a chat member 76, information relevant to the complaint is recorded by the invention in the server database 68. Thus, the complaint message encapsulates information about the complaint, such as the ID of the user filing the complaint (plaintiff), the ID of a user, if any, to which the complaint is directed (defendant), and a comment from the plaintiff. The chat client 62 is responsible for collecting this information, and the latter two pieces of information are optional. The complaint is subsequently processed by a (human) monitor 82. Because the relevant information is preserved with the registered complaint, a single monitor 82 can effectively monitor a plurality of chat rooms. Indeed, by spot-polling the various channels while at the same time responding (relatively) immediately to complaints, a single monitor is able to cover far more channels than was otherwise previously possible.

When a complaint is first added to the database 68, it is given a status of active. A complaint can have two other status types, namely assigned and resolved. The assigned status indicates that a complaint is being mediated by a chat monitor 82, and indicates who that chat monitor is. The resolved status indicates that a complaint has been mediated, and identifies the monitor who resolved the complaint. These three status types assist chat monitors in managing member complaints and preventing complaints from going unresolved.

More particularly, when a complaint is made by a user, the server-side chat service component 70 places a complaint record in the database 68 and transmits a summary message to the monitor's complaint channel 80. At this point, the complaint is considered active and unassigned. Monitors $82_1$–$82_n$ are alerted of the arrival of a new complaint by a monitor client 64, and they may review currently active complaints. When a monitor $82_1$ finds a complaint he or she wishes to handle, the monitor $82_1$ assigns the complaint to himself or herself. This marks the complaint as having been assigned, and indicates the identity of the monitor $82_1$ handling it so that multiple monitors $82_1$–$82_n$ do not conflict with one another over a single complaint.

Typically, the monitor $82_1$ then reviews the complaint information, attempts to mediate the complaint in accordance with suitable procedures of the on-line service, and then makes a decision on the complaint. For example, the monitor $82_1$ applies any penalties deemed necessary, and then marks the complaint as resolved. This final resolution stage completes the complaint pipeline and essentially closes a complaint. The resolved complaint becomes inactive and requires no further action by the monitor $82_1$. The complaint is not removed from the database 68, however, but instead remains in the database 68 as a method of tracking a member's complaint and penalty history.

Complaint Interface

The complaint channel interface 78 handles communications somewhat differently than does the normal channel interface 74. More particularly, the complaint channel interface 78 responds to three of the six notifications, that is, data sent by members and channel creation and deletion. The complaint channel interface 78 does nothing significant with a member join or member leave event (although it does store and free a small amount of memory used to track active members), and it does nothing with a text event.

Similar to a normal channel interface, the complaint channel interface 78 initializes itself on the channel creation event that creates an initial chat channel, and cleans up its data on the channel deletion event of the last channel in preparation for being freed from memory. Note that the channel deletion event occurs either when the last member in the channel leaves, or, if the channel is made permanent, when the server is shutting down.

The complaint channel interface 78 does its primary work via data events, as set forth in the list and description of supported data messages described below. Via these data events, the complaint channel interface 78 supports functionality, including complaints, complaint queries, penalty queries, complaint assignments, complaint resolutions, complaint context requests and penalty removal. Thus, in accordance with another aspect of the present invention, there is provided a protocol by which a specialized client (e.g., the monitor $82_1$) can gain access to the complaint database 68 and mediate complaints. This mediation includes reviewing complaints, applying, removing or modifying penalties against chat members, and reviewing chat member complaint and penalty histories.

Figure 3:
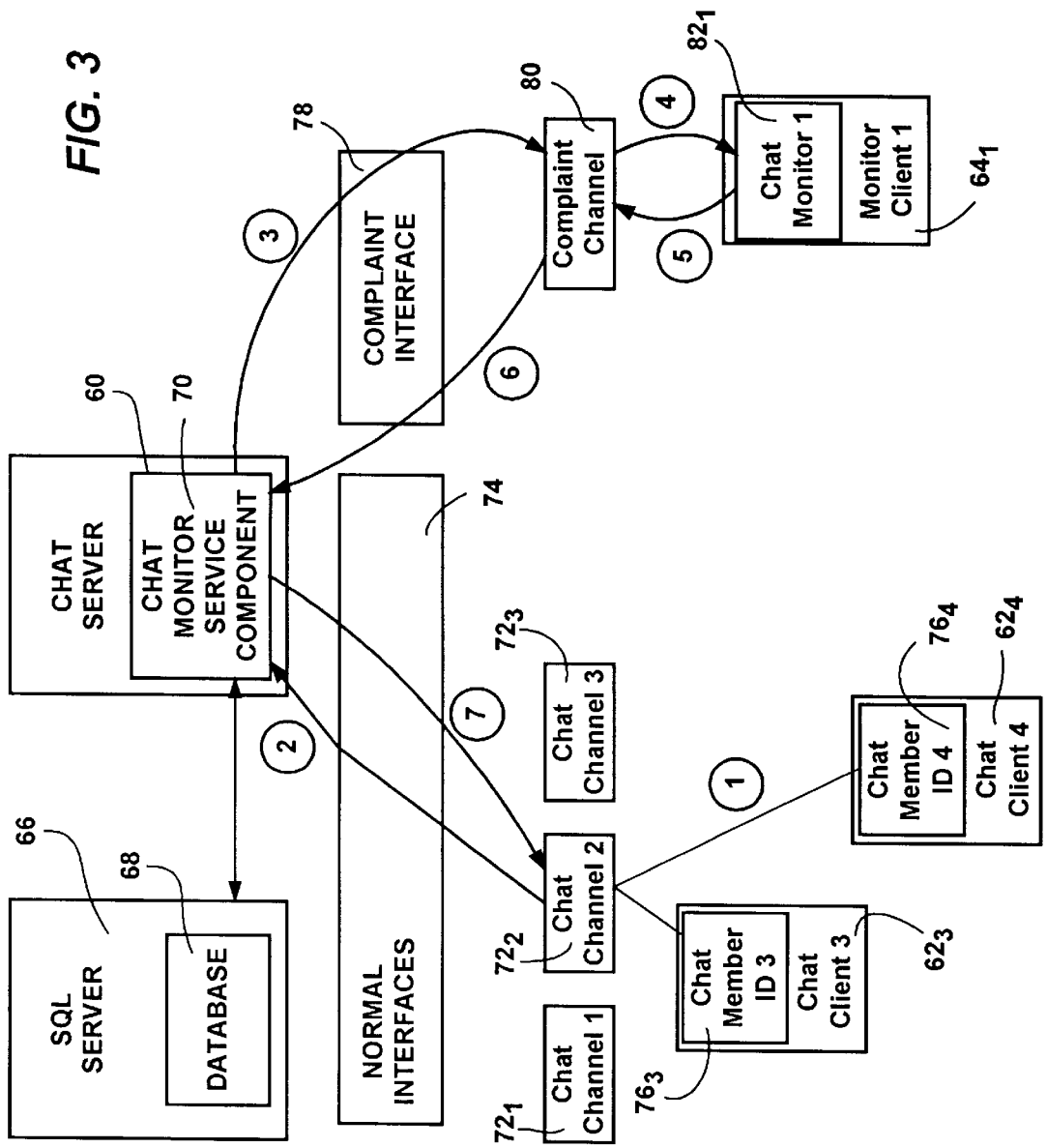
FIG. 3 is a block diagram representing the flow of a typical complaint message.

By way of example of how a complaint flows through the system, FIG. 3 represents a complaint occurring on the monitor chat channel $72_2$. As shown by the circled numerals beginning with (1), the complaint is first sent by a member (e.g., $76_3$) to the channel $72_2$, and (2) passed to the server-side chat service component 70. From there, the complaint is augmented and (3) routed to the complaint channel 80.

As previously described, a user complaint may include the ID of the plaintiff (member $76_3$, ID 3), the ID of the defendant (member $76_4$, ID 4), and a comment from the plaintiff $76_3$. To augment the complaint, the normal channel interface 74 adds information including the time of the complaint, the conversation context (described below) at the time of the complaint and the identity of the channel ($72_2$) on which the complaint occurred. When the complaint interface 78 receives this augmented complaint, it first causes the entire augmented complaint to be stored in the database 68, and then sends a message to the members (monitors $82_1$–$82_n$) of the complaint channel 80 to which it is attached, repeating all but the conversation context of the complaint. In this way, the chat monitors $82_1$–$82_n$ (who are running the chat monitor client software and who are members of the complaint channel 80) know immediately when a complaint occurs.

Thus, as represented in FIG. 3, a monitor client $64_1$ then (4) receives the augmented complaint message from the complaint channel 80. A monitor such as the monitor $82_1$ takes action based on the complaint, and (5) sends the action to the complaint channel 80. The action is (6) routed via the chat monitor component 80, and any penalty based on this action is (7) applied on the chat channel $72_2$ against to the offending member $76_4$. Note that the action is also recorded in the database 68 at this time.

Communication Protocols

As described above, the chat monitor system is separated into server-side components and client-side components. The server-side channel service manages the transactions with the SQL server database 68, and, in keeping with one aspect of the present invention, performs automated actions on chat members $76_1$–$76_n$. The client-side chat monitor clients $64_1$–$64_n$ are operated by human beings, i.e., the monitors $82_1$–$82_n$, who access the SQL server database 68 by talking to the server-side chat service component 70. As described in more detail below, the monitor client 64 feeds penalty and other information into the database 68 via the server-side chat service component 70.

Communication between the clients $62_1$–$62_n$, $64_1$–$64_n$ and server 60 occurs by the transmission of messages, via packets. Messages include a header which identifies the type of message, via a message signature, (described below), followed by data specific to the message type. The structure of a message is generally defined as set forth in the following table:

| Typedef DWORD | MSGID; |
|---|---|
| Typedef struct | _MsgType |
| { | |
|   MSGID | MsgType; |
| } MSGHEADER, | *PMSGHEADER; |

Many messages also have a variable-length amount of data appended to them, i.e., typically string data. This appended data is variable-length, and thus in order to minimize the actual amount of transmitted data, the variable data is not represented as members of the message structures. Instead, the variable data is appended to the end of the message structure, and each such message structure having variable data includes a set of macros (described below) for extracting the variable data from the actual message packet. Appended strings are null-terminated, and the null character is counted in the length for that field.

A simple message is set forth in the following table:

| Typedef struct _MsgSimple |
|---|
| { |
|   MSGHEADER  header; |
| } MSGSIMPLE, *PMSGSIMPLE; |

This simple message is used for "pinging" the channel to see if it supports complaint management, (i.e., essentially testing to see if the channel is complaint-capable, as described by steps 480–484, above), and for sending/receiving ACKnowledgements. To ping the channel, the client 62 sends a kmtTestComplaint message to the channel 72 by setting the header.MsgType member of the MSGSIMPLE structure to kmtTestComplaint. If the channel 72 supports complaints, then the channel 72 replies with a kmtComplaintACK message, also using the MSGSIMPLE structure. The client 62 listens for this ACK message to enable (or disable) its complaint features based on reception (or lack of reception) of the ACK within a reasonable amount of time.

A kmtComplaintACK message is also sent to the chat client 62 after the client sends a complaint message to a channel 72. This is intended to give the plaintiff some indication that the complaint has been received and will be handled as soon as possible. It is up to the chat client 62 to use or ignore the reply.

The incoming complaint message is sent by a chat client 62 when the user 76 of that client 62 makes a complaint. The chat client 62 sends a kmtInComplaint to the channel using the following structure and macros to encapsulate information from the plaintiff:

```
Typedef struct __InComplaint
{
    MSGHEADER   header;
    DWORD       cbComment;
    DWORD       cbTarget;
    //char      *pszComment;
    //char      *pszTarget;
} INCOMPLAINT, *PINCOMPLAINT;
```

Variable-length data is appended to the end of the message sent to the server-side chat service component 70. The comment field is the comment given by the plaintiff when the complaint was filed. The target field is the identity of the member, if any, that caused the plaintiff to complain, i.e., the defendant. Both of these fields are intended to be optional and it is up to the chat client to support them. If the length of either of these two fields as given by the cbComment and cbTarget members is zero, then the corresponding field is not present in the message.

The following macros can be used to access the appended data after it is determined that it is present:

| | |
|---|---|
| INCOMMENTDATA(p) | Pointer to beginning of extra data. |
| GETINCOMMENT(p) | Pointer to comment field, "\0" if none. |
| GETINTARGET(p) | Pointer to target MSN ID field, "\0" if none. |

An outgoing complaint message (sent by the server-side chat service component 70) is simply a redirection and augmentation of the incoming complaint message (received from the normal channel interface 74). It is sent to the complaint channel 80 and includes the information received as part of the incoming complaint message plus the identity (e.g., MSN ID) of the plaintiff and the channel name. Once an incoming complaint message is received, the server-side chat service component 70 sends a kmtOutComplaint message to the complaint channel 80 using the following message structure:

```
Typedef struct __OutComplaint
{
    MSGHEADER   header;
    DWORD       dwRecord;
    DWORD       cbComment;
    DWORD       dwSource;
    DWORD       cbTarget;
    DWORD       cbChannel;
    //char      *pszComment;
    //char      *pszSource;
    //char      *pszTarget;
    //char      *pszChannel;
} OUTCOMPLAINT, *POUTCOMPLAINT;
```

Variable-length data is appended to the end of this message. More particularly, the comment field contains any comment given by the plaintiff when the complaint was filed, while the source and target fields are the plaintiff's and defendant's identities (e.g., MSN IDs), respectively. The channel field is the channel on which the complaint occurred. Note that these fields are only be present if they were present in the original incoming complaint message.

The following macros can be used to access the appended data after it is determined that they are present:

| | |
|---|---|
| OUTCOMMENTDATA(p) | Pointer to beginning of appended data. |
| GETOUTCOMMENT(p) | Pointer to comment field, "\0" if none. |
| GETOUTCOMMENT (p) | Pointer to source field, "\0" if none. |
| GETOUTCHANNEL(p) | Pointer to source field, "\0" if none. |
| GETOUTTARGET(p) | Pointer to channel field, "\0" if none. |

Context Request Message

In order to resolve a complaint, a monitor 82 may desire to review the conversation leading up to the complaint. A context consists of the last n lines of conversation in the channel where the complaint originated. Each conversation line in the context buffer is delimited by a new-line character ("\n"). The context request message is used to request the context of a complaint.

The conversation context that is associated with each complaint can become very large, therefore it is not sent unless specifically requested. When a complaint message is relayed from a normal channel interface 74 to a complaint channel interface 78 and then sent to the complaint channel members (the chat monitors 82), the conversation context is omitted. The chat monitor client 64 specifically requests the conversation context associated with a complaint by sending a complaint context request message to the complaint channel interface 78. The complaint channel interface 78 then retrieves the complaint context from the database 68, and returns this context to the chat monitor 82 who requested it. In this way, bandwidth is preserved as the connection is not flooded with context data.

More particularly, the monitor 82 sends a kmtRequestContext message to the complaint channel 80 using the following message structure when it wants a complaint context:

```
Typedef struct __MsgRequestContext
{
    MSGHEADER   header;
    DWORD       dwID;
} MSGREQCONTEXT, *PMSGREQCONTEXT;
```

The dwID field is the record ID of the complaint whose context the monitor 82 wants to retrieve. If the context is successfully retrieved, then a kmtContext message will be sent by the complaint channel 80 back to the requester (monitor 82).

The context message is sent in response to the kmtRequestContext message. It is sent by the complaint channel 80 to the originator of the kmtRequestContext message using the following message structure:

```
Typedef struct __MsgContext
{
    MSGHEADER   header;
    DWORD       dwID;
    DWORD       cbContext;
    //char      *pszContext;
} MSGCONTEXT, *PMSGCONTEXT;
```

Variable-length data is appended to the end of this message, including the dwID member, which is the complaint record that this context belongs to. Also included is the context field, which is a single buffer of length cbContext that contains the context associated with this complaint. The following macros can be used to access the appended data after it is determined that it is present:

| | |
|---|---|
| GETCONTEXTDATA(p) | Pointer to beginning of appended data. |
| GETCONTEXTCONTEXT(p) | Pointer to context buffer, "\0" if none. |

Penalty Message

A penalty message is sent to the server-side chat service component 70 by the monitor client 64 when a penalty is applied to a channel participant 76. While the initial penalty is applied by the monitor client 64, the server-side chat service component 70 further tracks this information in the database 68 so that the penalty can be automatically applied or removed in the future, as previously described. The monitor client 64 sends a kmtPenalty message to the server-side chat service component 70 using the following structure:

```
Typedef struct __MsgPenalty
{
    MSGHEADER    header;
    PENID        penalty;
    time_t       tDuration;
    DWORD        dwRecordID;
    DWORD        cbMSNID;
    DWORD        cbReason;
    DWORD        cbChannel;
    //char           *pszMSNID;
    //char           *pszReason;
    //char         *pszChannel;
} MSGPENALTY,    *PMSGPENALTY;
```

The penalty member is an enumeration of penalties recognized by the server-side chat service component 70. Multiple penalties are not currently combined into a single penalty message, although such a message is feasible. The duration of the penalty is specified in seconds via the tDuration member, which is converted to an actual expiration time relative to the server's clock. Two predefined constants may be used for the duration, kpentNone and kpentForever, as set forth below.

Variable-length data is also appended to the end of this message. The MSN ID field (or equivalent) is the MSN ID of the member being penalized, and is their full identity (e.g., username@msn.com). The length of this field is given by cbMSNID, and should be non-zero. The reason field includes a brief textual explanation by the monitor 82 as to why he or she penalized the member 76, and the length of this field is given by cbReason. The channel field is the channel to which the penalty applies, and cbChannel specifies its length. If cbChannel is 0, the penalty applies to all channels. The MSN ID field is required for proper penalty application, and although optional, use of the reason field by the monitors 82 is strongly encouraged.

The following macros can be used to access the appended data after it is determined that they are present:

| | |
|---|---|
| PENALTYDATA(p) | Pointer to beginning of appended data. |
| GETPENALTYMSNID(p) | Pointer to MSN ID, "\0" if none. |

-continued

| | |
|---|---|
| GETPENALTYREASON(p) | Pointer to reason, "\0" if none. |
| GETPENALTYCHANNEL(p) | Pointer to channel, "\0" if none. |

Assign Message

An assign message is sent to the server-side chat service component 70 by a monitor client 64 when an active (unassigned) complaint has been assigned to a monitor 82 for mediation. The monitor client 64 sends a kmtAssign message to the server-side chat service component 70 using the following message structure:

```
Typedef struct __MsgAssign
{
    MSGHEADER    header;
    DWORD        dwRecord;
    DWORD        cbMSNID;
    //char             *pszMSNID;
} MSGASSIGN,    *PMSGASSIGN;
```

Variable-length data is appended to the end of this message. The dwRecord field is the ID of the complaint to be assigned, and the MSN ID field is the MSN ID of the monitor (e.g., $82_1$ to whom the complaint is being assigned, (the full MSN ID, e.g., username@msn.com). The length of this field is given by cbMSNID, and should of course be non-zero because the MSN ID field is required.

The following macros can be used to access the appended data after it is determined that data is present:

| | |
|---|---|
| ASSIGNDATA(p) | Pointer to beginning of appended data. |
| GETASSIGNMSNID(p) | Pointer to MSN ID, "\0" if not present. |

Resolve Message

A resolve message is sent to the server-side chat service component 70 by the monitor client 64 when an assigned complaint has been completely handled, and a monitor marks 82 the complaint as being resolved. The monitor client 64 sends a kmtresolve message to the server-side chat service component 70 using the following message structure:

```
Typedef struct __MsgResolve
{
    MSGHEADER    header;
    DWORD        dwRecord;
    DWORD        cbMSNID;
    //char             *pszMSNID;
} MSGRESOLVE, *PMSGRESOLVE;
```

Variable-length data is appended to the end of this message, including the dwRecord field, which is the ID of the complaint to be resolved. The MSN ID field is the MSN ID of the monitor that is resolving the complaint, and is their full MSN ID (e.g., username@msn.com). The length of this field is given by cbMSNID, and should again be non-zero because the MSN ID field is required.

The following macros can be used to access the appended data after it is determined that it is present:

| | |
|---|---|
| RESOLVEDATA (p) | Point to beginning of appended data. |
| GETRESOLVEMSNID (p) | Pointer to MSN ID, "\0" if none. |

Queries

At various times including those set forth above, the monitor client 64 requests information from the database 68. This may be in the form of a user's complaint or penalty history, a list of all currently active, assigned or resolved penalties, complaints submitted in the past two hours, and so on. The monitor client 64 does not directly access the database 68, but instead communicates a query to the complaint channel 80, which will then submit the query via the chat monitor component 70. After the query has been submitted and a response returned, the complaint channel 80 sends a kmtBegin message back to the requester, followed by a series of either kmtCRecord or kmtPRecord messages (depending on the type of query requested, one per row in the query's result set), and finishing with a kmtRecordEnd message.

The complaint and penalty query messages provide access to the chat monitor database 68 to the (potentially remote) chat monitor clients 64 through their connection to the chat server 60. The chat monitor client 64 sends a complaint or penalty query message when it wishes to pull data from the database 68. It specifies the criteria for the data, including plaintiff and defendant name, time of the complaint or penalty, time the penalty expires, type of penalty, channel where the complaint occurred, channel or channels where the penalty applies, and so on. The complaint channel interface 78 receives this query message and submits it to the database 68. The results of querying the database 68 are then sent back to the chat monitor client 64, which formats the information and presents it however it chooses. Queries are a read-only operation.

Complaint Query Message

A complaint query message is sent to the server-side chat service component 70 when the monitor client 64 wants to query the complaint table for a set of information. The monitor client 64 sends a kmtCQuery message using the following message structure:

```
Typedef struct _MsgComplaintQuery
{
    MSGHEADER      header;
    DWORD          dwRecord;
    time_t         tTimeReceived;
    char           szTimeCompare[2];
    Status         status;
    DWORD          cbPlaintiff;
    DWORD          cbDefendant;
    DWORD          cbAssignedTo;
    DWORD          cbResolvedBy;
    DWORD          cbChannel;
    //char             *pszPlaintiff;
    //char             *pszDefendant;
    //char             *pszAssignedTo;
    //char             *pszResolvedBy;
    //char             *pszChannel;
} MSGCQUERY, *PMSGCQUERY;
```

Variable-length data is appended to the end of this message. Each member of this structure corresponds to a field in the complaint table's schema. Each non-empty parameter specified in the message is combined using a logical AND to form the where clause of the query. The szTimeCompare member applies only to the tTimeReceived member and can be any of the following symbols: <, >, =, <= or >=.

Once this message is received by the complaint channel 80, it is used to construct an SQL query, which is then submitted for execution. After the query has been finished, a kmtRecordBegin message is sent to the requester, followed by a kmtCRecord message for every record in the query's result set (none if the query produced no results), and finishing with a kmtRecordEnd message.

The following macros can be used to access the variable data at the end of this message:

| | |
|---|---|
| CQUERYDATA(p) | Pointer to beginning of appended data. |
| GETCQUERYPLAINTIFF(p) | Pointer to plaintiff, "\0" if none. |
| GETCQUERYDEPENDENT(p) | Pointer to defendant, "\0" if none. |
| GETCQUERYASSIGNEDTO(p) | Pointer to assigned to field, "\0" if none. |
| GETCQUERYRESOLVEDBY(p) | Pointer to resolved by field, "\0" if none. |
| GETCQUERYCHANNEL(p) | Pointer to channel, "\0" if none. |

Complaint Record Message

The complaint record message is sent by the complaint channel 80 after performing a query in response to a kmtCQuery message. One complaint record message is sent for each record in the result set of this query, and uses the following message structure:

```
typedef struct _MsgComplaintRecord
{
    MSGHEADER      header;
    DWORD          dwID;
    time_t         tTimeReceived;
    Status         status;
    DWORD          cbPlaintiff;
    DWORD          cbDefendant;
    DWORD          cbAssignedTo;
    DWORD          cbResolvedBy;
    DWORD          cbComment;
    DWORD          cbChannel;
    //char             *pszPlaintiff;
    //char             *pszDefendant;
    //char             *pszAssignedTo;
    //char             *pszResolvedBy;
    //char             *pszComment;
    //char             *pszChannel;
} MSGCRECORD, *PMSGCRECORD;
```

Variable-length data is appended to the end of this message, and the members of this message correspond to a column in the complaint table's schema. If a field in the record is NULL (representing an empty field in the SQL table), then the corresponding field in the complaint record message will be "\0" and its length member will be one (1).

The following macros can be used to access the variable data at the end of this message:

| | |
|---|---|
| CRECORDDATA(p) | Pointer to beginning of appended data. |
| GETCRECORDPLAINTIFF(p) | Pointer to plaintiff field, "\0" if none. |
| GETCRECORDDEFENDANT(p) | Pointer to defendant field, "\0" if none. |
| GETCRECORDASSIGNEDTO(p) | Pointer to assigned to field, "\0" if none. |
| GETCRECORDRESOLVEDBY(p) | Pointer to resolved by field, "\0" if none. |
| GETCRECORDCOMMENT(p) | Pointer to comment field, "\0" if none. |
| GETCRECORDCHANNEL(p) | Pointer to channel field, "\0" if none. |

Penalty Query Message

A penalty query message is sent to the server-side chat service component 70 when the monitor client 64 wants to query the penalty table for a set of information. The monitor client 64 sends a kmtPQuery message using the following message structure:

```
Typedef struct _MsgPenaltyQuery
{
    MSGHEADER    header;
    DWORD        dwRecord;
         time_t     tTimeReceived;
         char
    szTimeRecComp [2];
         time_t     tTimeExpires;
         char
    szTimeExpComp [2];
         PENID      penalty;
         DWORD      cbMSNID;
         DWORD      cbChannel;
         //char          *pSZMSNID;
         //char          *pszChannel;
} MSGPQUERY, *PMSGPQUERY;
```

Variable-length data is appended to the end of this message. Each member of this structure corresponds to a field in the penalty table's schema. Each non-empty parameter specified in the message is combined using a logical AND to form the where clause of the query. The szTimeRecCompare and szTimeExpComp members applies to the tTimeReceived and tTimeExpires members, respectively, and can be any of the following symbols: <, >, =, <= or >=.

Once this message is received by the complaint channel 80, the message is used to construct an SQL query which is then submitted for execution. After the query has been finished, a kmtRecordBegin message is sent to the requester, followed by a kmtPRecord message for every record in the query's result set (none if the query produced no results), and finishing with a kmtRecordEnd message.

The following macros can be used to access the variable data at the end of this message:

| | |
|---|---|
| PQUERYDATA(p) | Pointer to beginning of appended data. |
| GETPQUERYMSNID(p) | Pointer to MSN ID, "\0" if none. |
| GETPQUERYCHANNEL(P) | Pointer to channel, "\0" if none. |

Penalty Record Message

The penalty record message is sent by the complaint channel 80 after performing a query in response to a kmtPQuery message. One penalty record message is sent for each record in the result set of this query, and uses the following message structure:

```
typedef struct _MsgPenaltyRecord
    MSGHEADER    header;
    DWORD        dwID;
    time_t       tTimeReceived;
    time_t       tTimeExpires;
    PENID        penalty;
    DWORD        cbMSNID;
    DWORD        cbComment;
    DWORD        cbChannel;
    //char            *pszMSNID;
    //char            *pszComment;
    //char            *pszChannel;
} MSGPRECORD, *PMSGPRECORD;
```

Variable-length data is appended to the end of this message, and the members of this message all correspond to a column in the penalty table's schema. If a field in the record is NULL (representing an empty field in the SQL table), then the corresponding field in the penalty record message will be "\0" and its length member will be one (1).

The following macros can be used to access the variable data at the end of this message:

| | |
|---|---|
| PRECORDDATA(p) | Pointer to beginning of appended data. |
| GETCRECORDMSNID(p) | Pointer to MSN ID field, "\0" if none. |
| GETCRECORDCOMMENT(p) | Pointer to comment field, "\0" if none. |
| GETCRECORDCHANNEL(p) | Pointer to channel field, "\0" if none. |

As can be seen from the foregoing detailed description, there is provided an improved chat room monitoring system and method that are based on the server side. The monitoring system and method allow a single individual to effectively monitor a plurality of chat rooms, and substantially eliminates the need for human involvement in re-applying user penalties or in causing penalties to expire. The monitoring system and method facilitate user complaints and facilitate mediation of those complaints.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

What is claimed is:

1. In a computer network configured for chat room conversations by a plurality of client users connected to at least one chat channel of a chat server for interconnecting the users for the exchange of user-provided content, a system for applying penalties against users, comprising, a database for storing penalty information corresponding to the identities of users, and a server-side chat service component connected to the database, the server-side chat service component receiving the identity of a user on a channel, querying the database with a query based on the identity of the user, receiving penalty information corresponding to the identity of the user from the database in response to the query, and applying a penalty to the user on the channel, the penalty corresponding to the penalty information.

2. The system of claim 1 further comprising a complaint channel for connecting chat monitor clients to the server-side chat service component therethrough.

3. The system of claim 1 further comprising means at the user side for transmitting complaints to the chat channel.

4. The system of claim 3 wherein at least some of the complaints include conversation context information therein.

5. The system of claim 3 wherein the server-side chat service component includes means for receiving the complaints from the chat channel and means for storing the complaints in the database.

6. The system of claim 5 wherein at least one of the complaints includes the identity of a user to which the complaint is directed.

7. The system of claim 5 further comprising means for recalling complaint information from the database for review by a monitor, and means for storing penalty information in the database based upon the review.

8. The system of claim 7 further comprising a complaint channel for connecting chat monitor clients to the server-side chat service component for review of complaint information.

9. The system of claim 1 wherein the chat server and client communicate by the transmission of packetized messages.

10. The system of claim 1 wherein the database is in an SQL Server.

11. The system of claim 1 wherein one of the penalties corresponds to a ban, and the server-side chat service component for applying the penalty prevents the user from joining the channel.

12. The system of claim 1 further comprising means for transmitting a warning to a user.

13. The system of claim 1 wherein the server-side chat service component for applying a penalty includes means for transmitting a message to the user.

14. The system of claim 1 wherein one of the penalties corresponds to a kick, and the server-side chat service component for applying the penalty includes means for disconnecting the user from the channel.

15. The system of claim 1 wherein one of the penalties corresponds to a spectate, and the server-side chat service component for applying the penalty includes means for preventing text messages from the user from being received by other users of the channel.

16. The system of claim 1 further comprising means for aggregating penalties into another type of penalty.

17. The system of claim 1 further comprising means for removing a penalty from at least one user.

18. The system of claim 17 wherein the means for removing a penalty includes means for querying the database with a query based on the identity of a user and for receiving penalty information corresponding to the identity of the user from the database in response to the query, the penalty information including an expiration time, and means for comparing the expiration time against a current time.

19. The system of claim 17 further comprising means for periodically establishing a penalty review, wherein the means for removing a penalty is connected to the means for establishing a penalty review to periodically remove a penalty.

20. The system of claim 17 wherein the means for removing a penalty operates in response to a request from a user to join a channel.

21. In a computer network configured for chat room conversations by a plurality of client users connected to at least one chat channel of a chat server for interconnecting the users for the exchange of user-provided content, a mechanism for handling a complaint from a user, comprising, means for receiving a complaint message at the chat channel from a user, a complaint channel for connecting to a monitor client, means for forwarding the complaint message to the complaint channel, and means for receiving a response to the complaint message from the monitor client.

22. The mechanism of claim 21 further comprising means for forwarding the response to at least one user.

23. The mechanism of claim 22 wherein the means for forwarding the complaint message to the complaint channel includes a server-side chat service component.

24. The mechanism of claim 21 wherein the means for forwarding the complaint message to the complaint channel includes means for storing the complaint message in a database and means for recalling the complaint message from the database.

25. The mechanism of claim 21 wherein the response corresponds to a penalty, and further comprising means for applying the penalty to a client user.

26. The mechanism of claim 21 wherein the response corresponds to a penalty, and further comprising means for storing the penalty in association with an identity of a user in a database.

27. The mechanism of claim 21 wherein the complaint message includes conversation context information associated therewith.

28. In a computer network configured for chat room conversations by client users connected to chat channels of a chat server, a method for applying penalties at the server-side against users, comprising, storing penalty information with respect to each user in a database, receiving the identity a user, querying the database with the identity of the user to retrieve penalty information therefor, determining if the user has penalty information associated therewith that is not expired, and if so, applying a penalty to the user.

29. The method of claim 28 wherein receiving the identity of the user includes receiving a request from the user to join a channel.

30. The method of claim 28 wherein receiving the identity of the user includes periodically determining the identity of at least one user actively connected to a channel.

31. In a computer network configured for chat room conversations by client users connected to a chat channel of a chat server, a method of handling complaints from users, comprising, establishing a complaint channel for connection to a monitor client, receiving a complaint message at the chat channel, forwarding the complaint message to the complaint channel, and receiving a response to the complaint message from the monitor client.

32. The method of claim 31 wherein forwarding the complaint message to the complaint channel includes storing the complaint message in a database and recalling the complaint message from the database.

33. The method of claim 31 wherein forwarding the complaint message to the complaint channel includes augmenting the complaint message with additional information.

34. The method of claim 32 wherein the response corresponds to a penalty, and further comprising applying the penalty to a client user.

35. The method of claim 32 wherein the response corresponds to a penalty, and further comprising storing the penalty in association with an identity of a user in a database.

36. The system of claim 1 wherein the chat server is connected to at least some of the client users via a wide area network.

37. The mechanism of claim 21 wherein the chat server is connected to at least some of the client users via a wide area network.

38. The method of claim 28 wherein the chat server is connected to at least some of the client users via a wide area network.

39. The method of claim 28 wherein one of the penalties corresponds to a ban, and wherein applying the penalty comprises preventing the user from joining the channel.

40. The method of claim 28 wherein applying the penalty comprises transmitting a warning to a user.

41. The method of claim 28 wherein applying a penalty comprises transmitting a message to the user.

42. The method of claim 28 wherein one of the penalties corresponds to a kick, and wherein applying the penalty comprises disconnecting the user from the channel.

43. The method of claim 28 wherein one of the penalties corresponds to a spectate, and wherein applying the penalty comprises preventing text messages from the user from being received by other users of the channel.

44. The method of claim 28 further comprising aggregating penalties into another type of penalty.

45. The method of claim 28 further comprising removing a penalty from at least one user.

46. The method of claim 45 wherein removing a penalty comprises querying the database with a query based on the identity of a user and receiving penalty information corresponding to the identity of the user from the database in response to the query, the penalty information including an expiration time, and comparing the expiration time against a current time.

47. The method of claim 45 further comprising periodically establishing a penalty review, wherein removing a penalty is connected to establishing a penalty review to periodically remove a penalty.

48. The method of claim 45 wherein removing a penalty operates in response to a request from a user to join a channel.

49. The method of claim 31 wherein the chat server is connected to at least some of the client users via a wide area network.

* * * * *

UNITED STATES PATENT AND TRADEMARK OFFICE
CERTIFICATE OF CORRECTION

PATENT NO. : 6,076,100
DATED : June 13, 2000
INVENTOR(S) : Cottrille et al.

It is certified that error appears in the above-identified patent and that said Letters Patent is hereby corrected as shown below:

Column 4,
Line 47, "$74_n$" should read -- $74_n$, --.

Column 6,
Line 46, "independent" should read -- independently --.

Column 7,
Line 11, "them" should read -- him or her --.
Line 36, "penalty.)" should read -- penalty). --.
Line 55, "time.)" should read -- time). --.

Column 8,
Lines 14-15, "the invention" should read -- the present invention --.

Column 9,
Line 60, "against to the" should read -- against the --.

Column 11,
Line 64, "are only be" should read -- will only be --.

Column 14,
Line 28, "(e.g., $82_1$" should read -- (e.g., $82_1$) --.
Lines 44-45, "monitor marks 82" should read -- monitor 82 marks --.
Line 46, "kmtresolve" should read -- kmtResolve --.

Column 16,
Line 23, "GETCQUERYDEPENDENT(p)" should read -- GETCQUERYDEFENDANT(p) --.

Column 17,
Line 37, "*pSZMSNID;" should read -- *pszMSNID; --.

UNITED STATES PATENT AND TRADEMARK OFFICE
CERTIFICATE OF CORRECTION

PATENT NO. : 6,076,100
DATED : June 13, 2000
INVENTOR(S) : Cottrille et al.

It is certified that error appears in the above-identified patent and that said Letters Patent is hereby corrected as shown below:

Column 20,
Lines 30-31, "identity a user" should read -- identity of a user --.

Signed and Sealed this

Ninth Day of November, 2004

JON W. DUDAS
*Director of the United States Patent and Trademark Office*